United States Patent
Waniczek et al.

(10) Patent No.: US 10,280,844 B2
(45) Date of Patent: May 7, 2019

(54) CONTROL SYSTEMS FOR CONTROLLING POWER SYSTEMS BASED ON FUEL CONSUMPTION AND RELATED PROGRAM PRODUCTS

(71) Applicant: General Electric Company, Schenectady, NY (US)

(72) Inventors: Phillip Waniczek, Baden (CH); Dirk Therkorn, Waldshut-Tiengen (DE); Alexey Mozharov, Nussbaumen bei Baden (CH); Dominic Graf, Volketswil (CH)

(73) Assignee: General Electric Company, Schenectady, NY (US)

( * ) Notice: Subject to any disclaimer, the term of this patent is extended or adjusted under 35 U.S.C. 154(b) by 231 days.

(21) Appl. No.: 15/353,917

(22) Filed: Nov. 17, 2016

(65) Prior Publication Data
US 2018/0135536 A1 May 17, 2018

(51) Int. Cl.
*F02C 9/54* (2006.01)
*G05B 15/02* (2006.01)

(52) U.S. Cl.
CPC .............. *F02C 9/54* (2013.01); *G05B 15/02* (2013.01); *F05D 2270/05* (2013.01);
(Continued)

(58) Field of Classification Search
CPC ... F05D 2270/331; F05D 2270/11; F02C 9/54
(Continued)

(56) References Cited

U.S. PATENT DOCUMENTS

| 8,843,293 B2 | 9/2014 | Rofka et al. |
| 2004/0102872 A1 | 5/2004 | Schick et al. |

(Continued)

FOREIGN PATENT DOCUMENTS

| CN | 102969740 A | 3/2013 |
| CN | 104852373 A | 8/2015 |

(Continued)

OTHER PUBLICATIONS

Hedley "Effect of Gas Turbine Efficiency and Fuel Cost on Cost of Producing Electric Power" Environmental Protection Agency Technology Series, Office of Research and Development, May 1974, 32 Pages (Year: 1974).*

(Continued)

*Primary Examiner* — Emilio J Saavedra
(74) *Attorney, Agent, or Firm* — Ernest G. Cusick; Hoffman Warnick LLC

(57) ABSTRACT

Power systems are disclosed. The power system may include a turbine component of a gas turbine system, and a computing device(s) in communication with the power plant. The computing device(s) may be configured to control the power plant system by performing various processes including defining a turbine inlet temperature range for a combustion gas flowing through the turbine component of the gas turbine system. The turbine inlet temperature range may be based on a desired operational load for the power plant system. The processes performed by the computing device(s) may also include determining fuel and maintenance cost ranges based on the turbine inlet temperature range, calculating a desired turbine inlet temperature range for the combustion gas based on the determined fuel and maintenance cost range, and adjusting an actual turbine inlet temperature of the combustion gas to be within the calculated, desired turbine inlet temperature range.

18 Claims, 9 Drawing Sheets

(52) U.S. Cl.
CPC ...... *F05D 2270/07* (2013.01); *F05D 2270/11* (2013.01); *F05D 2270/303* (2013.01); *F05D 2270/331* (2013.01); *Y02E 20/16* (2013.01)

(58) Field of Classification Search
USPC ......................................................... 700/282
See application file for complete search history.

(56) References Cited

U.S. PATENT DOCUMENTS

| | | | | |
|---|---|---|---|---|
| 2009/0150040 A1* | 6/2009 | Rofka | ................ | F02C 9/54 |
| | | | | 701/100 |
| 2011/0037276 A1* | 2/2011 | Hoffmann | ............ | F02C 9/22 |
| | | | | 290/40 C |
| 2015/0184549 A1* | 7/2015 | Pamujula | ............ | F01K 23/101 |
| | | | | 700/287 |
| 2015/0322789 A1 | 11/2015 | Pandey et al. | | |
| 2017/0051681 A1* | 2/2017 | Arias Chao | ............ | F02C 9/20 |

FOREIGN PATENT DOCUMENTS

| | | |
|---|---|---|
| JP | 01144101 A | 6/1989 |
| KR | 20140048949 A | 4/2014 |
| WO | 2009080282 A2 | 7/2009 |
| WO | 2009109446 A1 | 9/2009 |
| WO | 2013/134020 A1 | 9/2013 |

OTHER PUBLICATIONS

Extended European Search Report and Opinion issued in connection with corresponding EP Application No. 17201026.6 dated Jul. 5, 2018.

* cited by examiner

CONTROL SYSTEMS FOR CONTROLLING POWER SYSTEMS BASED ON FUEL CONSUMPTION AND RELATED PROGRAM PRODUCTS

BACKGROUND

The disclosure relates generally to power systems, and more particularly, to reducing operational costs for gas turbine system and/or power plants while maintaining a desired load or power output.

Power systems typically include a variety of different turbomachines and/or systems that are used to generate operational load and/or power output. Two conventional power systems used to generate operational loads include gas turbine systems and combined cycle power plants, which typically include a gas turbine system(s). Conventional combined cycle power plants employ one or multiple gas turbine system(s) operatively coupled to one or multiple steam turbine system(s). The gas turbine system includes a compressor coupled to a gas turbine. The gas turbine is usually coupled to and drives an external component, such as a generator, for producing a load or power output. The steam turbine system includes a high pressure (HP) turbine portion operatively coupled to an intermediate pressure (IP) turbine portion that, in turn, is coupled to a low pressure (LP) turbine. Similar to the gas turbine of the gas turbine system, the HP, IP and LP turbines are employed to drive an external component (e.g., generator). In a typical combined cycle power plant, exhaust gas from the gas turbine is passed to a heat recovery steam generator (HRSG), which may be used to reheat and provide steam to the various turbines of the steam turbine system for enhanced efficiency of the system and/or power plant. Downstream of the HRSG the exhaust gas is released to the atmosphere through a stack.

Various operational parameters and operational concepts (e.g. bypass, speed, throttle and the like) influence the operation of conventional power systems (e.g., gas turbine systems, combined cycle power plants). For example, the operational parameters and/or characteristics (e.g., maximum hot gas temperature, maximum rotational shaft speed, maximum mass flow for steam, and so on) of the power system and its various components (e.g., compressor, gas turbine, HP/IP/LP turbines) may determine the operational life and/or maximum operational load and/or power output that conventional power systems are capable of producing. As such, the conventional operation conditions and/or operational load for conventional power systems are typically predetermined based on the operational parameters, concepts and/or characteristics of power systems, and its components, to improve the operational life, power output and efficiency of the power systems. In some conventional examples, conventional power systems may even include various stages or fixed operational lines (e.g., low, intermediate, high), where each line may produce or generate different operational loads based on changes to the operation conditions of the power system and its various components. For example, the high operational line may generate a larger operational load than the intermediate or low operational line by increasing the turbine outlet temperature in the power systems.

However, these conventional power systems (e.g., gas turbine systems, combined cycle power plants) and/or operational conditions and/or control of the power systems do not take into consideration costs associated with operating the power system. For example, determining the operation conditions and more important control settings of conventional power systems typically do not include considering and/or analyzing fuel costs for a gas turbine system and/or the maintenance costs of components of the power systems. As such, in some examples, changes to the operation concept of conventional power systems, while generating a larger or the same operational load, may significantly increase costs associated with the operation of the power plant.

SUMMARY

A first aspect of the disclosure provides a system, including: a power plant system including: a turbine component of a gas turbine system; and at least one computing device in communication with the power plant system, the at least one computing device configured to control the power plant system by performing processes including: defining a turbine inlet temperature range for a combustion gas flowing through the turbine component of the gas turbine system, the turbine inlet temperature range based on a desired operational load for the power plant system; determining a fuel cost range based on the turbine inlet temperature range; determining a maintenance cost range based on the turbine inlet temperature range; calculating a desired turbine inlet temperature range for the combustion gas flowing through the turbine component of the gas turbine system based on the determined fuel cost range and the determined maintenance cost range; and adjusting an actual turbine inlet temperature of the combustion gas flowing through the turbine component to be within the calculated, desired turbine inlet temperature range for the combustion gas flowing through the turbine component.

A second aspect of the disclosure provides a computer program product including program code, which when executed by at least one computing device, causes the at least one computing device to control a power plant system including a turbine component of a gas turbine system, by performing processes including: defining a turbine inlet temperature range for a combustion gas flowing through the turbine component of the gas turbine system, the turbine inlet temperature range based on a desired operational load for the power plant system; determining a fuel cost range based on the turbine inlet temperature range; determining a maintenance cost range based on the turbine inlet temperature range; calculating a desired turbine inlet temperature range for the combustion gas flowing through the turbine component of the gas turbine system based on the determined fuel cost range and the determined maintenance cost range; and adjusting an actual turbine inlet temperature of the combustion gas flowing through the turbine component to be within the calculated, desired turbine inlet temperature range for the combustion gas flowing through the turbine component.

A third aspect of the disclosure provides a system including: a gas turbine system including a turbine component; and at least one computing device in communication with the gas turbine system, the at least one computing device configured to control the gas turbine system by performing processes including: defining a turbine inlet temperature range for a combustion gas flowing through the turbine component of the gas turbine system, the turbine inlet temperature range based on a desired operational load for the gas turbine system; determining a fuel cost range based on the turbine inlet temperature range; determining a maintenance cost range based on the turbine inlet temperature range; calculating a desired turbine inlet temperature range for the combustion gas flowing through the turbine component of the gas turbine system based on the determined fuel cost range and the determined maintenance cost range; and adjusting an actual turbine inlet temperature of the combustion gas flowing through the turbine component to be within the calculated, desired turbine inlet temperature range for the combustion gas flowing through the turbine component.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
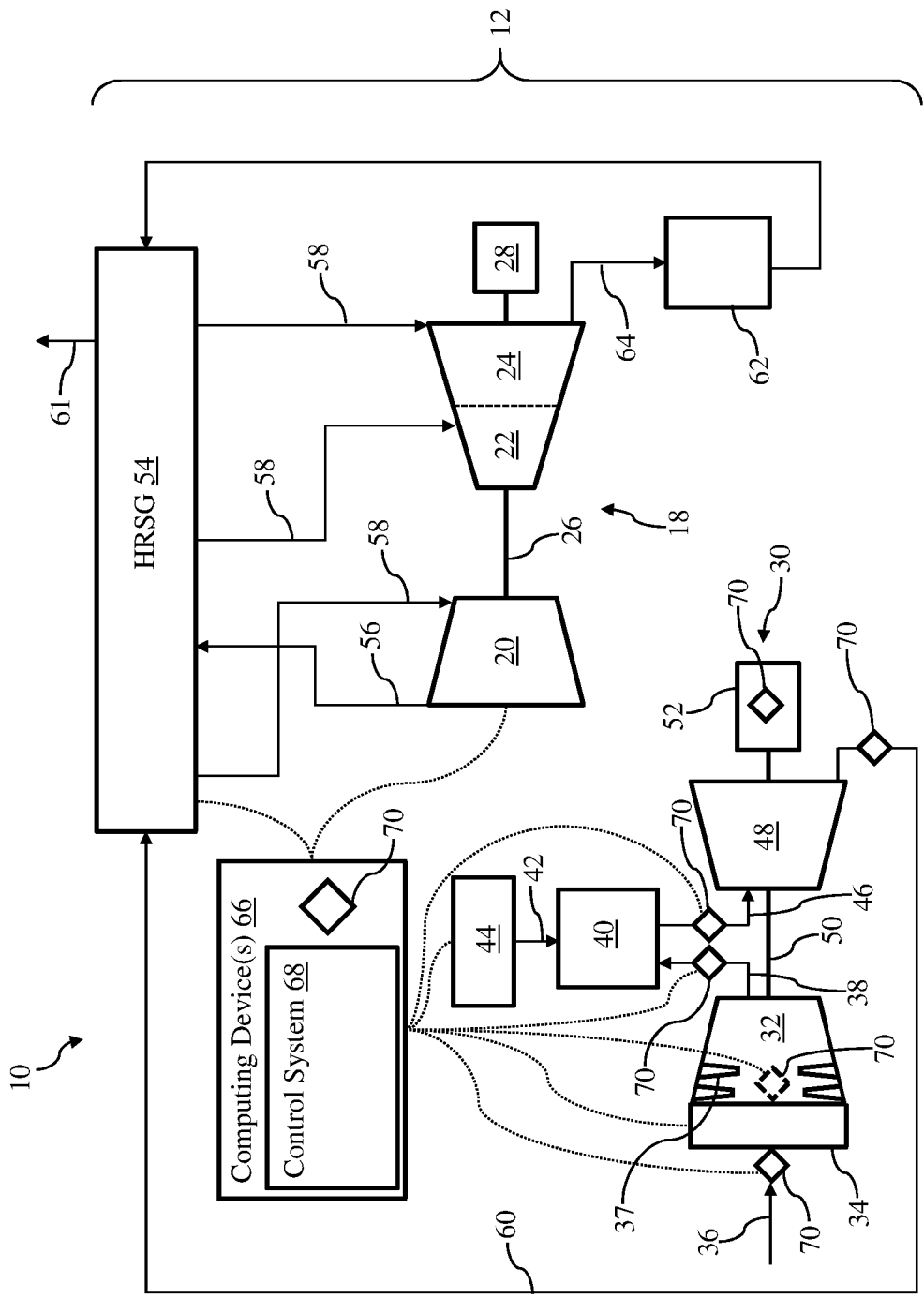
FIG. 1 shows a schematic depiction of a combined cycle power plant system including a gas turbine system, a steam turbine system and a control system, according to various embodiments.

As an initial matter, in order to clearly describe the current disclosure it will become necessary to select certain terminology when referring to and describing relevant machine components within a gas turbine system and/or combined cycle power plants. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

As indicated above, the disclosure relates generally to power plants, and more particularly, to reducing operational costs for power plants while maintaining a desired load or power output.

These and other embodiments are discussed below with reference to FIGS. 1-9. However, those skilled in the art will readily appreciate that the detailed description given herein with respect to these Figures is for explanatory purposes only and should not be construed as limiting.

FIG. 1 shows a schematic depiction of a system 10 according to various embodiments of the disclosure. As shown, system 10 can include a combined cycle power plant system 12 (hereafter, "power plant system 12") including a steam turbine (ST) system 18, which in the depiction shown, can include a high pressure (HP) portion 20, an intermediate pressure (IP) portion 22 and a low pressure (LP) portion 24, as is known in the art. HP portion 20, IP portion 22 and LP portion 24 of ST system 18 may all be coupled and/or positioned on and/or may be configured to rotate a shaft 26 to produce mechanical work and/or to drive an additional component of ST system 18. As shown in FIG. 1, shaft 26 of ST system 18 may be coupled to and/or may drive an external component, and more specifically, a generator 28 configured to generate power and/or produce a load.

Power plant system 12 can further include a gas turbine (GT) system 30. GT system 30 may include a compressor 32 and a variable inlet guide vane (VIGV) 34 coupled or positioned on compressor 32 and/or positioned upstream of an inlet of compressor 32. Compressor 32 compresses an incoming flow of fluid 36 (e.g., air) that may flow through VIGV 34 into compressor 32. As discussed herein, VIGV 34 may regulate the mass flow or flow rate of fluid 36 as it flows through VIGV 34 to compressor 32. In other non-limiting examples discussed herein, GT system 30 may include adjustable stator vanes 37 positioned within compressor 32. Similar to VIGV 34, adjustable stator vanes 37 positioned within compressor 32 may be configured to be adjusted (e.g., change position) to regulate the mass flow or flow rate of fluid 36 flowing through compressor 32. In the non-limiting example where GT system 30 includes both VIGV 34 and adjustable stator vanes 37, both VIGV 34 and adjustable stator vanes 37, or alternatively one of the two, may be utilized to regulate the mass flow of fluid 36 through compressor 32. Although shown as including both VIGV 34 and adjustable stator vanes 37 in FIG. 1, it is understood that GT system 30 of power plant system 12 may include only VIGV 34, or alternatively, only adjustable stator vanes 37. Additionally, although compressor 32 is shown to include two stages of adjustable stator vanes 37, it is understood that the number of adjustable stator vane stages in compressor 32 may be merely illustrative. As such, compressor 32 may include more or less stages of adjustable stator vanes 37 that may be configured to regulate mass flow of fluid 36, as discussed herein.

Compressor 32 delivers a flow of compressed fluid 38 (e.g., compressed air) to a combustor 40. Combustor 40 mixes the flow of compressed fluid 38 with a pressurized flow of fuel 42 provided by a fuel supply 44 and ignites the mixture to create a flow of combustion gas 46. As discussed herein, the temperature of combustion gas 46 may be regulated, at least in part, by the amount of fuel 42 provided by fuel supply 44 and the mass flow of fluid 36 used to form compressed fluid 38. Additionally, it is understood that the temperature of the combustion gas 46 may be regulated by other suitable means, components and/or operations. The flow of combustion gas 46 is in turn delivered to a turbine component 48, which typically includes a plurality of turbine blades (not shown). The flow of combustion gas 46 drives turbine component 48 to produce mechanical work. The mechanical work produced in turbine component 48 drives compressor 32 via a shaft 50, and may be used to drive a generator 52 (e.g., external component) configured to generate power and/or produce a load.

Although power plant system 12 is shown in FIG. 1 to include a dual-shaft configuration, where two separate generators 28, 52 are utilized, it is understood that in other non-limiting examples, ST system 18 and GT system 30 may share a single shaft and in turn, may share a single generator. Additionally, although power plant system 12 is shown to only include a single ST system 18 and single GT system 30, it is understood that power plant system 12 may include a plurality of ST systems 18 and/or GT system(s) 30 that may be configured to generate an operational load and/or power output.

Power plant system 12 can further include a heat recovery steam generator (HRSG) 54 fluidly connected with the ST system 18 (e.g., with HP portion 20, IP portion 22 and/or LP portion 24) and GT system 30. As shown in the non-limiting example of FIG. 1, HRSG 54 may be fluidly connected and/or coupled with ST system 18 via exhaust conduit(s) 56 to receive exhaust fluid (e.g., steam) from ST system 18, as well as, provide steam to the portions of ST system 18 via supply conduits 58. Additionally in the non-limiting example, HRSG 54 may be fluidly connected and/or coupled with GT system 30 via an exhaust channel 60 coupled to and/or in fluid communication with turbine component 48. Exhaust channel 60 may provide exhaust fluid (e.g., gas) from GT system 30 to HRSG 54 to be utilized in generating and/or heating steam for ST system 18. A stack 61 of HRSG 54 may exhaust or release (excess or used) gas and/or fluid from HRSG 54 into the atmosphere and/or out of power plant system 12

Power plant system 12 can further include a condenser 62. Condenser 62 may be in fluid communication and/or may be fluidly coupled with various components of power plant system 12. In a non-limiting example, condenser 62 may be fluidly connected and/or coupled to LP portion 24 of ST system 18 via steam exhaust duct 64. Condenser 62 may be configured to condense exhaust flow and/or bypass flow (not shown) from ST system 18 and/or HRSG 54 (not shown), and providing condensed fluid (e.g., condensate water) to HRSG 54, as is known in the art.

As shown in FIG. 1, system 10 can include at least one computing device 66 configured to control power plant system 12. Computing device(s) 66 can be hard-wired and/or wirelessly connected to and/or in communication with power plant system 12, and its various components (e.g., ST system 18, VIGV 34, fuel supply 44 and so on) via any suitable electronic and/or mechanic communication component or technique. Computing device(s) 66, and its various components discussed herein, may be a single stand-alone system that functions separate from another power plant control system (e.g., computing device)(not shown) that may control and/or adjust operations and/or functions of power plant system 12, and its various components (e.g., ST system 18, GT system 30 and so on). Alternatively, computing device(s) 66 and its components may be integrally formed within, in communication with and/or formed as a part of a larger power plant control system (e.g., computing device)(not shown) that may control and/or adjust operations and/or functions of power plant system 12, and its various components (e.g., ST system 18, GT system 30 and so on).

In various embodiments, computing device(s) 66 can include a control system 68 and a plurality of sensors 70, as described herein, for controlling operations of power plant system 12. As discussed herein control system 68 can control power plant system 12, and its various components, to improve operation and/or reduce operational costs while maintaining a desired load and/or power output.

As shown in FIG. 1, computing device(s) 66 may include and/or may be in electrical and/or mechanical communication with a plurality of sensors 70 positioned throughout system 10. Although a portion of the plurality of sensors 70 (e.g., sensor 70 within and/or in communication with generator 52) are not depicted to be in communication with computing device(s) 66, it is understood that all sensors 70 of system 10 are in communication with and/or are capable of providing detected-data relating to power plant system 12 to computing device(s) 66, as discussed herein. As shown in the non-limiting example of FIG. 1, sensor 70 (shown in phantom) of and/or connected to computing device(s) 66 may be positioned within compressor 32, adjacent to and/or downstream of VIGV 34. Additionally, or alternatively, at least one distinct/additional sensor 70 may be positioned in distinct portions of GT system 30. For example, sensor(s) 70 may be positioned upstream of compressor and VIGV 34, within a conduit (not shown) positioned between compressor 32 and combustor 40 that may receive compressed fluid 38, within a conduit (not shown) positioned between compressor 32 and turbine component 48 that may receive combustion gas 46, within turbine component 48, on or in communication with shaft 50, on or in communication with generator 52 and/or within exhaust channel 60 of GT system 30.

Sensor(s) 70 in communication with computing device(s) 66 of system 10 may be any suitable sensor configured to detect and/or determine operational characteristics, and/or physical state variables/quantities of the various fluids (e.g., fluid 36, fuel 42, combustion gas 46 and so on) including, but not limited to temperature, pressure, density and/or speed of the fluids flowing through gas turbine system 30. Additionally, sensor(s) 70 may be any suitable sensor configured to detect and/or determine operational characteristics, and/or physical state variables/quantities of the various components (e.g., compressor 32, turbine component 48, shaft 50, generator 52 and so on) including, but not limited to shaft 50 rotational speed, generated operational load on generator 52 and so on. Although five sensors 70 are shown, it is understood that in another non-limiting example, system 10 may include only one sensor 70, so long as sensor 70 may be configured to provide computing device(s) 66, and specifically control system 68, with information or data relating to operational characteristics, and/or physical state variables/quantities for GT system 30 during operation. The number of sensors 70 shown in FIG. 1 is merely illustrative and non-limiting. As such, system 10 may include more or less sensors 70 than what is depicted in the Figures.

Sensors 70 may be configured to provide computing device(s) 66, and specifically control system 68, with information or data relating to operational characteristics, and/or physical state variables/quantities of GT system 30 to calculate a mass flow of the fluid(s) for GT system 30. That is, computing device(s) 66 and/or control system 68 may calculate the mass flow of fluids within GT system 30 using the data relating to the operational characteristics and/or physical state variables/quantities for GT system 30 obtained by sensor(s) 70. Additionally, and as discussed herein, data relating to operational characteristics, and/or physical state variables/quantities of the fluid(s) utilized by GT system 30 may be utilized to define, determine and/or calculate a turbine inlet temperature (TIT) and/or TIT ranges for GT system 30. As discussed herein, the (calculated) mass flow of the fluid(s) within GT system 30 and TIT ranges may be utilized to improve operation of power plant system 12 and/or reduce operational costs associated with power plant system 12.

Figure 2:
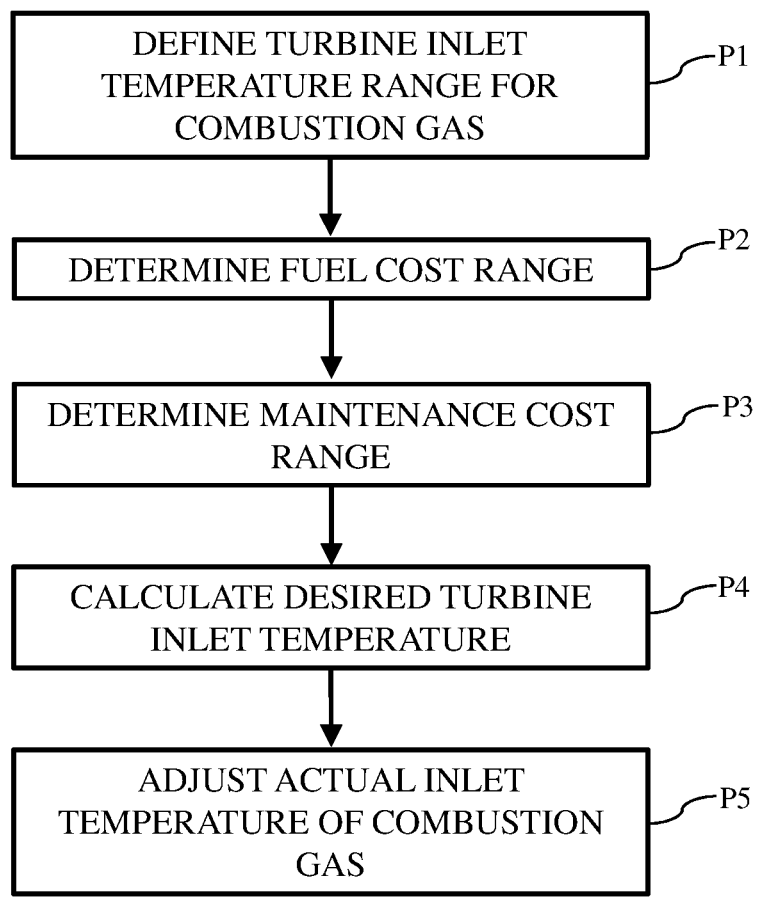
FIG. 2 shows a flow chart of an example process for controlling operation of a combined cycle power plant using a control system, according to embodiments.

FIG. 2 shows a flow diagram illustrating non-limiting example processes of controlling power plant system 12. These processes can be performed, e.g., by at least one computing device 66 including control system 68 (see, FIG. 1), as described herein. In other cases, these processes can be performed according to a computer-implemented method of controlling power plant system 12. In still other embodiments, these processes can be performed by executing computer program code on computing device(s) 66, causing computing device(s) 66, and specifically control system 68, to control operation of power plant system 12. With continued reference to FIG. 1, the processes shown in the flow diagram of FIG. 2 are discussed in detail below.

In process P1, an empirical turbine inlet temperature (TIT) range for combustion gas 46 flowing through turbine component 48 of GT system 30 is defined. Specifically, an empirical TIT (hereafter, "TIT") may be defined, determined and/or calculated using data relating to operational characteristics, and/or physical state variables/quantities of the fluid(s) (e.g., temperature, density, and so on) utilized by GT system 30 and/or operational characteristics of GT system 30 (e.g., shaft 50 rotational speed, generated operational load on generator 52 and so on). The defined TIT range for combustion gas 46 is based on a fixed, constant, maintained and/or desired operational load for power plant system 12 including GT system 30. Specifically, the defined TIT range for combustion gas 46 is based on maintaining a fixed, constant, predetermined, and/or desired operational load for power plant system 12, as produced by GT system 30 solely or in conjunction with ST system 18. As such, the defined TIT range may include a minimum TIT ($TIT_{MIN}$), a maximum TIT ($TIT_{MAX}$) and various TITs in between, where each TIT of the defined TIT range may ensure power plant system 12 is operating at and/or maintaining the desired operational load. Defining the TIT range for combustion gas 46 may also include determining operational parameters of GT system 30, and its various components (e.g., maximum/minimum turbine inlet temperature (TIT), maximum rotational speed of shaft 50, maximum/minimum mass flow of fluid 36 through compressor 32, and the like). These operational parameters of GT system 30 and its various components (e.g., compressor 32, turbine component 48, and so on) may be predetermined, calculated, and/or known operational limitations or constraints, industry standard and/or may be specific to the components forming GT system 30. Based on the determined operational parameters of GT system 30 of power plant system 12, the TIT range for combustion gas 46 flowing through turbine component 48 of GT system 30 may be generated. The generated TIT range for combustion gas 46 may then be adjusted (e.g., narrowed, modified and so on) to form the defined TIT range in the instance where a portion of the generated TIT range may not maintain the constant, predetermined, and/or desired operational load for power plant system 12 (e.g., too high temperature, to little mass flow).

In process P2, a fuel cost range for GT system 30 is determined. The fuel cost range for GT system 30 is determined based on the defined TIT range (e.g., process P1). Determining the fuel cost range may include calculating a fuel cost per hour of operating power plant system 12 across the defined TIT range. That is, the determined fuel cost range may represent a cost range of the amount of fuel, and thus heat input, required to power GT system 30 for a single hour to maintain a constant, predetermined and/or desired operational load for power plant system 12. As such, the fuel cost range for GT system 30 may include a minimum fuel cost ($Fuel_{MIN}$), a maximum fuel cost ($Fuel_{MAX}$) and various fuel costs there between, corresponding to a TIT of the defined TIT temperature range. As discussed herein in detail, for power plant systems 12 the minimum fuel cost ($Fuel_{MIN}$) is typically associated with the maximum TIT ($TIT_{MAX}$), and the maximum fuel cost ($Fuel_{MAX}$) is typically associated with the minimum TIT ($TIT_{MIN}$).

In process P3, a maintenance cost range for GT system 30 is determined. The maintenance cost range for GT system 30 is determined based on the defined TIT range (e.g., process P1). Determining the maintenance cost range may include calculating a maintenance cost per hour of operating power plant system 12 across the defined TIT range. That is, the determined maintenance cost range may represent a cost range of system and/or component maintenance for GT system 30 as GT system 30 operates for one hour with each TIT for combustion gas 46 within the TIT range, and while maintaining the constant, predetermined and/or desired operational load for power plant system 12. The system and/or component maintenance may include, but is not limited to, the amount of required repair, adjustment, correction, replacement and/or inoperable/down time for GT system 12 and its various components (e.g., compressor 32, turbine component 48 and so on). As such, the maintenance cost range for GT system 30 may include a minimum maintenance cost (Main$_{MIN}$), a maximum Maintenance cost (Main$_{MAX}$) and various maintenance costs there between, corresponding to a TIT of the defined TIT temperature range. As discussed herein in detail, the minimum maintenance cost (Main$_{MIN}$) is typically associated with the minimum TIT (TIT$_{MIN}$), and the maximum maintenance cost (Main$_{MAX}$) is typically associated with the maximum TIT (TIT$_{MAX}$).

In process P4, a desired TIT range for combustion gas 46 flowing through turbine component 48 of GT system 30 is calculated. The desired TIT range may be calculated based on the determined fuel cost range (e.g., process P2) and the determined maintenance cost range (e.g., process P3). That is, the determined fuel cost range, the determined maintenance cost range, and associated relationships and/or formulas for each of the fuel and maintenance cost ranges, may be analyzed, compared, manipulated, combined and/or performing computations to generate a combined fuel and maintenance cost range (Fuel+Main) within the defined TIT range, and ultimately calculate a desired TIT range for combustion gas 46 flowing through turbine component 48 of GT system 30. Additionally, the desired TIT range may also be calculated based on standard current, actual and/or operational parameters (e.g., actual or operational TIT) and/or associated costs of power plant system 12. The calculating of the desired TIT range for combustion gas 46 may also include calculating a preferred TIT for combustion gas 46. The calculated preferred TIT may be a single TIT for combustion gas 46 within the calculated, desired TIT range that improves operational and/or thermal efficiency of power plant system 12, and/or provides the greatest reduction in operational cost associated with power plant system 12, as discussed herein. The calculated, desired TIT range may be a temperature found and/or included within the defined TIT range for combustion gas 46 flowing through turbine component 48 of GT system 30.

In process P5, an actual or operational TIT of combustion gas 46 flowing through turbine component 48 of GT system 30 is adjusted. Specifically, the actual TIT of combustion gas 46 may be adjusted to be within the calculated, desired TIT range for combustion gas 46 flowing though turbine component 48 of GT system 30. Adjusting the actual or operational TIT of combustion gas 46 to be within the calculated, desired TIT range for combustion gas 46 may include regulating the fuel 42 mass flow and/or mass flow of fluid 36 flowing compressor 32 of GT system 30 to maintain the fixed, constant and/or desired operational load for power plant system 12. The mass flow of fluid 36 may be regulated by adjusting (e.g., opening, closing) VIGV 34 positioned on and/or upstream of compressor 32 of GT system 30 and/or adjusting variable stator vanes 37 positioned within compressor 32. Adjusting VIGV 34 and/or variable stator vanes 37 may also include increasing or decreasing the mass flow of fluid 36 through VIGV 34, and in turn, compressor 32. Adjusting the actual or operational TIT of combustion gas 46 to be within the calculated, desired TIT range for combustion gas 46 may include adjusting the actual or operational TIT of combustion gas 46 to be identical to the calculated, preferred TIT. Additionally, and as discussed herein, adjusting the actual or operational TIT of combustion gas 46 to be within the calculated, desired TIT range for combustion gas 46 may also include reducing fuel 42 consumption by GT system 30 of power plant system 12, increasing thermal efficiency of power plant system 12 and/or reducing overall operational cost of power plant system 12. In a non-limiting example, the operational and/or thermal efficiency of HRSG 54 of power plant system 12 is improved because the exhaust gas from GT system 30 increases when the TIT is adjusted (e.g., increases), thus improving thermal efficiency of power plant system 12.

It is understood that in the flow diagrams shown and described herein, other processes or operations may be performed while not being shown, and the order of processes can be rearranged according to various embodiments. For example, although shown as being performed in succession, processes P2 and P3 may be performed simultaneously. Additionally, intermediate processes may be performed between one or more described processes. The flow of processes shown and described herein is not to be construed as limiting of the various embodiments.

Figure 3:
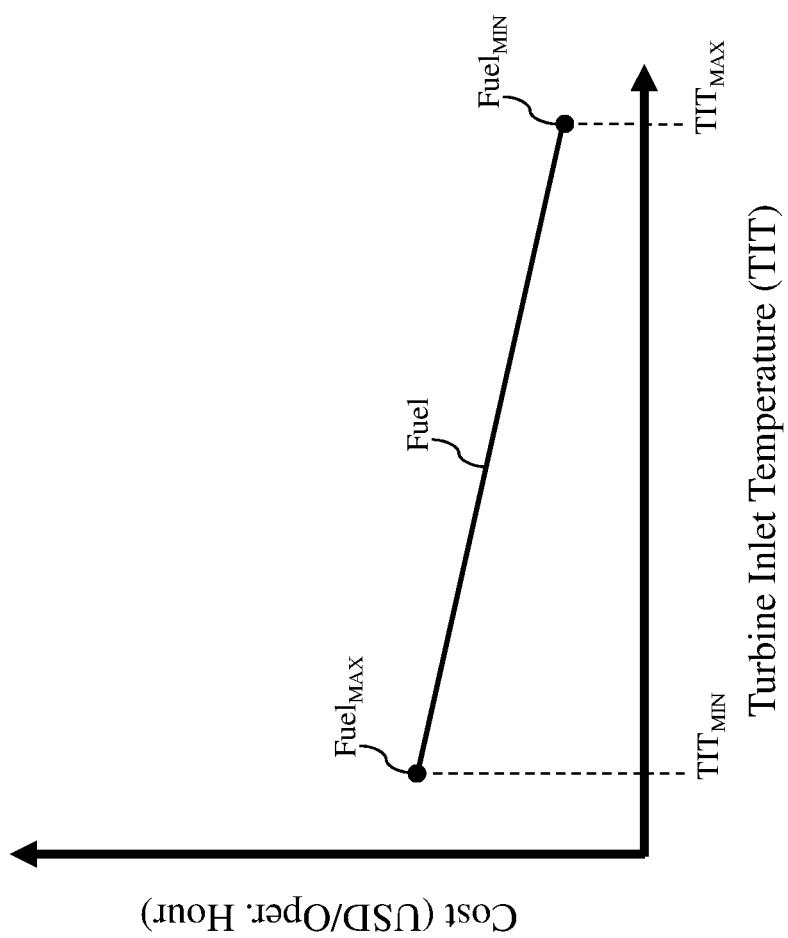
FIG. 3 shows an example Fuel Cost (per operational hour) v. Turbine Inlet Temperature (TIT) graph for operation of the gas turbine system of the combined cycle power plant shown in FIG. 1, according to embodiments.
Figure 4:
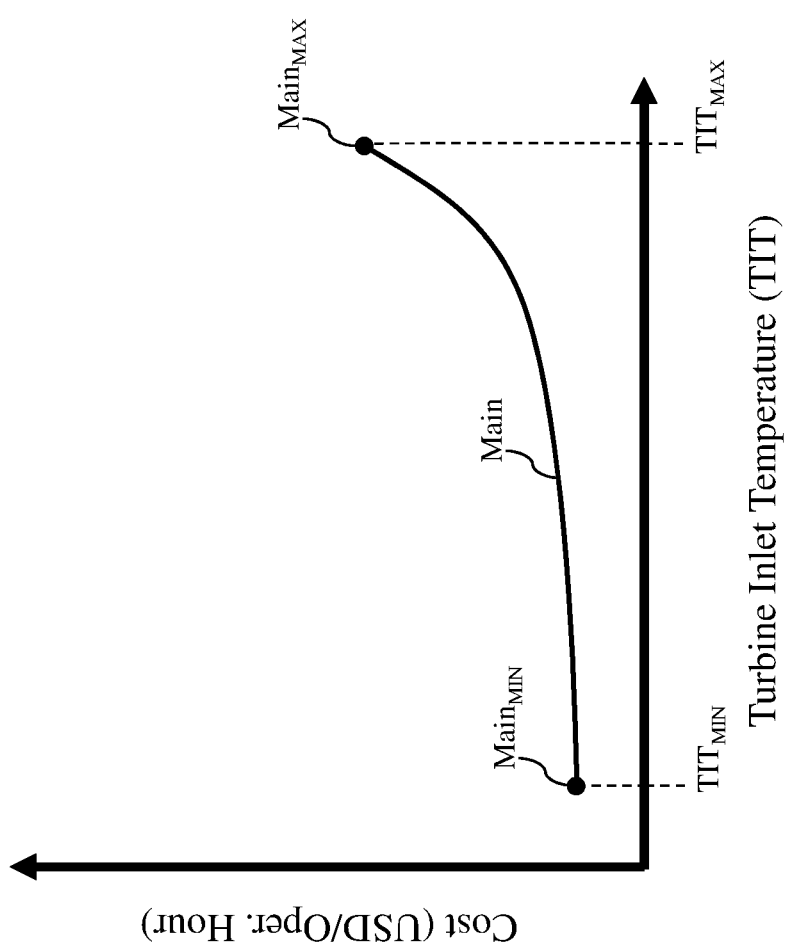
FIG. 4 shows an example Maintenance Cost (per operational hour) v. Turbine Inlet Temperature (TIT) graph for operation of the gas turbine system of the combined cycle power plant shown in FIG. 1, according to embodiments.
Figure 5:
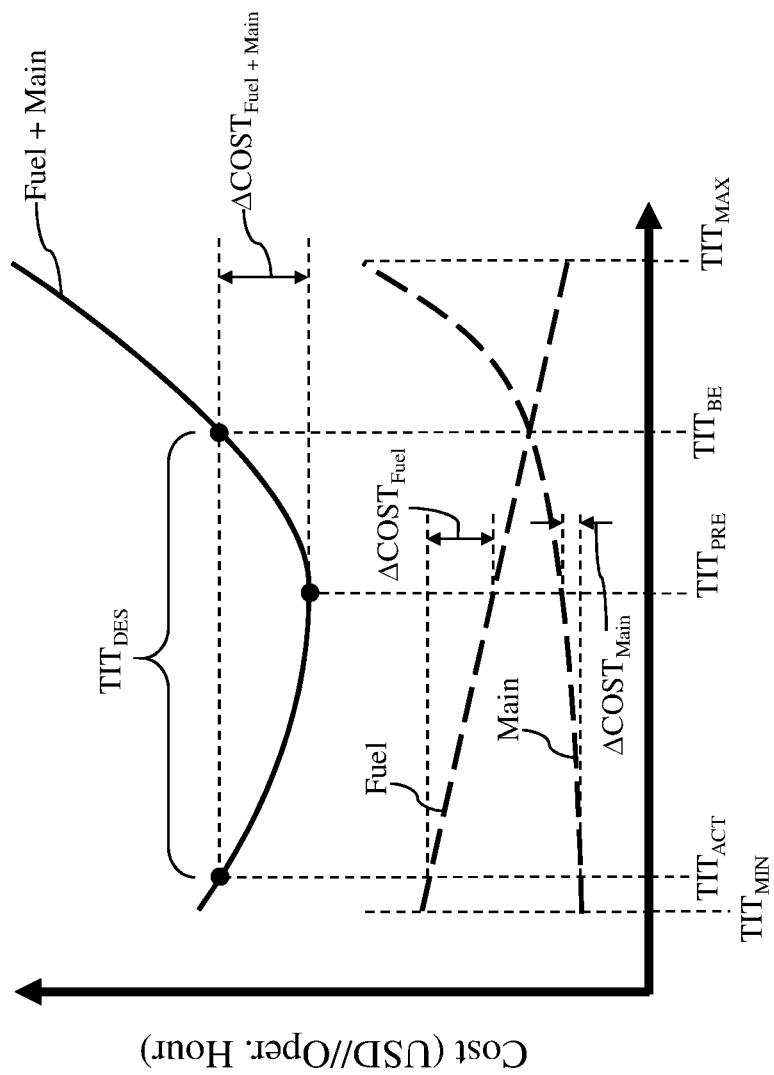
FIG. 5 shows an example Fuel and Maintenance Cost (per operational hour) v. Turbine Inlet Temperature (TIT) graph for operation of the gas turbine system of the combined cycle power plant shown in FIG. 1, according to embodiments.

FIGS. 3-5 depict various Cost versus Turbine Inlet Temperature (TIT) graphs for operations of GT system 30 in power plant system 12. Specifically, FIG. 3 depicts a cost versus TIT graph for a fuel cost range based on a defined TIT range for operation of GT system 30, FIG. 4 depicts a cost versus TIT graph for a maintenance cost range based on the defined TIT range for operation of GT system 30, and FIG. 5 depicts a cost versus TIT graph for the calculated and/or combined fuel and maintenance cost ranges based on the defined TIT range for operation of GT system 30. With continued reference to FIGS. 1 and 2, the process of controlling power plant system 12 using control system 68 of computing device(s) 66 (see, FIG. 1) may now be discussed herein with respect to FIGS. 3-5.

As discussed herein with respect to process P1 (see, FIG. 2), a defined and/or calculated TIT range for operation of GT system 30, as shown in FIGS. 3-5, may be based on maintaining a predetermined and/or desired, constant operational load for power plant system 10. Additionally, the defined TIT range as depicted in FIGS. 3-5, may be based on predetermined/calculated operational parameters, and/or physical state variables/quantities of the fluid(s) utilized by GT system 30 and/or operational characteristics of GT system 30 and its various components (e.g., compressor 32, turbine component 48 and so on). As such, and as discussed above, the defined TIT range identified between a minimum TIT (TIT$_{MIN}$) and a maximum TIT (TIT$_{MAX}$), may ensure that power plant system 12 can maintain its desired, constant operational load, so long as combustion gas 46 flowing through turbine component 48 has a temperature within the TIT range and a corresponding inlet mass flow to the GT system 30.

Turning to FIG. 3, a cost versus TIT graph for a fuel cost range based on the defined TIT range for operation of GT system 30 is shown. Each of the points or plots of the line indicating fuel costs depicted in FIG. 3 may identify the cost of fuel per operational hour of GT system 30 at the corresponding TIT within the defined TIT range, as discussed herein with respect to process P2. Additionally, the fuel cost range identified by the line indicating fuel costs also represents the cost of fuel per operational hour of GT system 30 to maintain the desired, constant operational load for power plant system 12. As shown in the non-limiting example of FIG. 3, the fuel cost range based on the defined TIT range may be substantially linear. That is, the fuel cost within the fuel cost range may decrease in a substantially linear manner as the corresponding TIT within the TIT range increases. As shown in FIG. 3, the maximum fuel cost (Fuel$_{MAX}$) may correspond and/or may be equal to the minimum TIT (TIT$_{MIN}$), the minimum fuel cost (Fuel$_{MIN}$) may correspond and/or may be equal to the maximum TIT ($TIT_{MAX}$), and the fuel costs identified there between may decrease (e.g., linearly decrease).

FIG. 4 shows a cost versus TIT graph for a maintenance cost range based on the defined TIT range for operation of GT system 30. Each of the points or plots of the line indicating maintenance costs depicted in FIG. 4 may identify the cost of maintenance per operational hour that may be required as GT system 30 operates at the corresponding TIT within the defined TIT range, as discussed herein with respect to process P3. Additionally, the maintenance cost range identified by the line indicating maintenance costs also represents the cost of maintenance per operational hour of GT system 30 and/or of the power plant system 12 to maintain the desired, constant operational load for power plant system 12. Distinct from the fuel cost range depicted in FIG. 3, the maintenance cost range based on the defined TIT range may increase (e.g. exponentially). That is in the non-limiting example depicted in FIG. 4, the maintenance cost within the maintenance cost range may increase in a substantially exponential manner as the corresponding TIT within the TIT range also increases. In other non-limiting example, maintenance cost range may increase in a substantial constant manner (e.g., constant slope). The more the TIT increases, the greater the change or increase in the associated or corresponding maintenance cost. As shown in FIG. 4, and opposite to the fuel cost range depicted in FIG. 3, the minimum maintenance cost ($Main_{MIN}$) may correspond and/or may be equal to the minimum TIT ($TIT_{MIN}$), the maximum maintenance cost ($Main_{MAX}$) may correspond and/or may be equal to the maximum TIT ($TIT_{MAX}$). Additionally, the maintenance costs identified there between the minimum maintenance cost ($Main_{MIN}$) and the maximum maintenance cost ($Main_{MAX}$) may increase exponentially.

FIG. 5 depicts a cost versus TIT graph for the calculated and/or combined fuel and maintenance (Fuel+Main) cost range based on the defined TIT range for operation of GT system 30. Additionally, and for comparative purposes, FIG. 5 also depicts the fuel cost range (shown in phantom) depicted in FIG. 3 and the maintenance cost range (shown in phantom) depicted in FIG. 4. Similar to fuel and maintenance cost ranges, each of the points or plots of the line indicating the calculated and/or combined fuel and maintenance (Fuel+Main) cost range depicted in FIG. 5 may identify the cost relationship of the combined fuel and maintenance per operational hour that may be required as GT system 30 operates at the corresponding TIT within the defined TIT range. Additionally, the cost relationship of the combined fuel and maintenance identified by the line indicating the combined fuel and maintenance (Fuel+Main) cost range also represents the combined cost per operational hour of GT system 30 to maintain the desired, constant operational load for power plant system 12.

As discussed herein with respect to process P4, the fuel cost range and the maintenance range may be analyzed, compared, manipulated, combined and/or undergo computations to generate a combined fuel and maintenance cost range (Fuel+Main) depicted in FIG. 5. Once generated, a desired TIT range ($TIT_{DES}$) for combustion gas 46 flowing through turbine component 48 of GT system 30 may be calculated and/or identified using the combined fuel and maintenance cost range (Fuel+Main). Additionally, calculating and/or identifying the desired TIT range ($TIT_{DES}$) for combustion gas 46 may also be dependent, at least in part, on an actual TIT ($TIT_{ACT}$) for combustion gas 46 and the associated combined fuel and maintenance cost of operation at the actual TIT ($TIT_{ACT}$). In the non-limiting example shown in FIG. 5, the desired TIT range ($TIT_{DES}$) for combustion gas 46 flowing through turbine component 48 of GT system 30 may be calculated and/or identified as the range of TIT between the actual TIT ($TIT_{ACT}$) for combustion gas 46 and a breakeven TIT ($TIT_{BE}$), which indicates the highest TIT for combustion gas 46 of GT system 30 having the same or identical combined fuel and maintenance cost of operation as the actual TIT ($TIT_{ACT}$). That is, while the breakeven TIT ($TIT_{BE}$) is greater than the actual TIT ($TIT_{ACT}$), the combined fuel and maintenance cost at the breakeven TIT ($TIT_{BE}$) is equal to the combined fuel and maintenance cost at the actual TIT ($TIT_{ACT}$). As such, the desired TIT range ($TIT_{DES}$) may be the range of TIT calculated and/or identified between the breakeven TIT ($TIT_{BE}$) and the actual TIT ($TIT_{ACT}$), which have lower associated combined fuel and maintenance costs of operation. As discussed herein, allowing combustion gas 46 to flow through GT system 30 at any one of the desired TIT range ($TIT_{DES}$) may result in a reduced operational cost for power plant system 12.

In addition to, or alternative to, calculating the desired TIT range ($TIT_{DES}$), a preferred TIT ($TIT_{PRE}$) may be calculated and/or identified. Specifically, the preferred TIT ($TIT_{PRE}$) may be calculated and/or may identify a single TIT within the desired TIT range ($TIT_{DES}$) that may provide the largest change (e.g., decrease) in combined fuel and maintenance costs of operation from the actual TIT ($TIT_{ACT}$). In a non-limiting example shown in FIG. 5, the preferred TIT ($TIT_{PRE}$) may be calculated and/or identified as the lowest cost point (e.g., vertex) on the combined fuel and maintenance cost range (Fuel+Main). Although combustion gas 46 of GT system 30 having any TIT within the desired TIT range ($TIT_{DES}$) will result in a decrease in combined fuel and maintenance costs, combustion gas 46 having a TIT equal to the preferred TIT ($TIT_{PRE}$) will yield the largest decrease in combined fuel and maintenance costs when compared to the cost associated with operating GT system 30 at the actual TIT ($TIT_{ACT}$).

Once the combined fuel and maintenance cost range (Fuel+Main), the desired TIT range ($TIT_{DES}$) and/or the preferred TIT ($TIT_{PRE}$) for combustion gas 46 flowing through turbine component 48 of GT system 30 is calculated and/or identified, control system 68 of computing device(s) 66 may control power plant system 12 (see, FIG. 1). Specifically, control system 68 of computing device(s) 66 may adjust an actual TIT ($TIT_{ACT}$) for combustion gas 46 flowing to gas turbine 48 to be identical to one of the TIT within the desired TIT range ($TIT_{DES}$) for combustion gas 46. Additionally, control system 68 of computing device(s) 66 may adjust an actual TIT ($TIT_{ACT}$) for combustion gas 46 flowing to gas turbine 48 to be identical to the preferred TIT ($TIT_{PRE}$) for combustion gas 46 that may be included within and/or calculated using the desired TIT range ($TIT_{DES}$). As discussed herein with respect to process P5, the actual TIT ($TIT_{ACT}$) may be adjusted by regulating the fuel 42 mass flow supplied by the fuel tank 44 and/or adjusting the mass flow of fluid 36 flowing through compressor 32. In a non-limiting example shown in FIG. 1, control system 68 of computing device(s) 66 may regulate the fluid mass flow 36 flowing to compressor 32 by adjusting VIGV 34 and/or adjustable stator vanes 37 to increase or decrease the amount of fluid 36 that flows to compressor 32. In the non-limiting example where the mass flow is decreased, the TIT for combustion gas 46 flowing to turbine component 48 may be adjusted (e.g., increased) and maintained within the desired TIT range ($TIT_{DES}$) with the requirement of less fuel 42 provided by supply tank 44. Additionally, and as discussed herein, adjusting the actual TIT ($TIT_{ACT}$) to a TIT included within the desired TIT range ($TIT_{DES}$) and/or to be identical to the preferred TIT ($TIT_{PRE}$) may ensure power plant system 12 operates, produces and/or maintains the fixed, constant and/or desired operational load. Furthermore, it is understood that the actual TIT range ($TIT_{ACT}$) may be continuously adjusted to match a TIT included within the desired TIT range ($TIT_{DES}$) and/or to maintain operation of power plant system 12 at the fixed, constant and/or desired operational load.

Operating at the desired TIT range ($TIT_{DES}$) for combustion gas 46 may reduce fuel consumption and/or increase thermal and/or operational efficiency of power plant system 12, while maintaining a desired, fixed and/or constant operational load for power plant system 12. In a non-limiting example, thermal efficiency of power plant system 12 may increase as a result of an increase in the thermal GT system 30 exhaust energy. The increase in the thermal and/or operational efficiency of power plant system 12 is a result of the increase in temperature of the exhaust gas from turbine component 48 of GT system 30 after GT system 30 is operating with combustion gas 46 within the desired TIT range. The increase in thermal GT system 30 exhaust energy, and resulting increase in thermal efficiency of power plant system 12, may occur even though the thermal and/or operational efficiency of GT system 30 may decrease as a result of adjusting (e.g., decreasing) the mass flow rate and/or adjusting (e.g., increasing) the TIT during operation of GT system 30, as discussed herein.

Additionally, the overall cost of operation for power plant system 12 may be reduced by allowing control system 68 of computing device(s) 66 to control the operation of power plant system 12, as discussed herein. As shown in the non-limiting example of FIG. 5, the actual TIT ($TIT_{ACT}$) may be the TIT for GT system 30 that is predetermined based on the operational parameters of GT system 30, industry standards and/or calculated operations for power plant system 12. By performing the processes for controlling the operation of power plant system 12 using control system 68 (e.g., adjusting the mass flow of fluid 36 to GT system 30 through VIGV 34 and/or adjustable stator vanes 37, adjusting the fuel 42 flow to combustor 40) to maintain desired TIT range ($TIT_{DES}$) of combustion gas 46 flowing to turbine component 48, the overall cost savings for still achieving the fixed, constant and/or desired operational load is readily apparent. Specifically, as shown in FIG. 5, the overall change or decrease in cost ($\Delta COST_{Fuel+Main}$) when comparing GT system 30 operating under the actual TIT ($TIT_{ACT}$) with any TIT included within the desired TIT range ($TIT_{DES}$) is significant. This is especially evident when comparing the actual TIT ($TIT_{ACT}$) with the preferred TIT ($TIT_{PRE}$) included within and/or calculated using the desired TIT ($TIT_{DES}$). This is further supported when comparing the change in fuel cost ($\Delta COST_{Fuel}$) with the change in maintenance cost ($\Delta COST_{Main}$). That is, and as shown in FIG. 5, while the maintenance cost increases slightly when comparing the GT system 30 operating under the actual TIT ($TIT_{ACT}$) with the desired TIT range ($TIT_{DES}$), the fuel cost decreases dramatically (e.g., 2-3× the change in maintenance cost) when compared to the maintenance cost. As such, the overall cost for operating power plant system 12, as discussed herein is reduced and/or improved.

Although discussed herein as being utilized with power plant system 12, computing device(s) 66, and specifically control system 68, may be utilized with just GT system 30. That is, computing device(s) 66 and control system 68 may be utilized to control the operation of GT system 30 to improve operation and/or reduce operational costs while maintaining a desired load and/or GT system 30.

Figure 6:
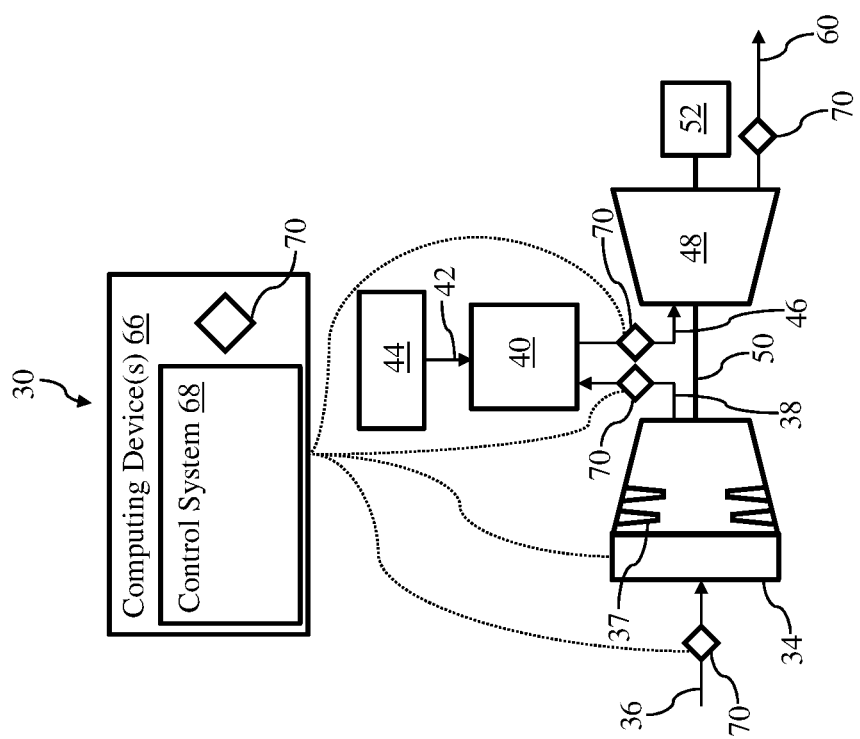
FIG. 6 shows a schematic depiction of a gas turbine system and a control system, according to various embodiments.

Turning to FIG. 6, GT system 30 including computing device(s) 66 and control system 68 is shown. GT system 30 may be substantially identical to GT system 30 depicted in FIG. 1 as a part of power plant system 12. It is understood that similarly numbered and/or named components may function in a substantially similar fashion. Redundant explanation of these components has been omitted for clarity.

As discussed herein, computing device(s) 66 and its various components (e.g., control system 68, sensor(s) 70) may be configured to collect and/or analyze data to aid in controlling and/or improving operation of GT system 30. That is, computing device(s) 66 and control system 68 may be utilized to control the operation of GT system 30 to improve operation and/or reduce operational costs while maintaining a desired load of GT system 30 by following similar processes and/or operations as similarly discussed herein with respect to processes P1-P5, and shown in FIG. 2. However, some portions of the processes of controlling GT system 30 using control system 68 may be distinct from the processes discussed above with respect to controlling power plant system 12 including GT system 30 (see, FIGS. 1-5). For example, and as discussed in detail below, the fixed, constant and/or desired operational load that may be maintained is for GT system 30 alone.

Figure 7:
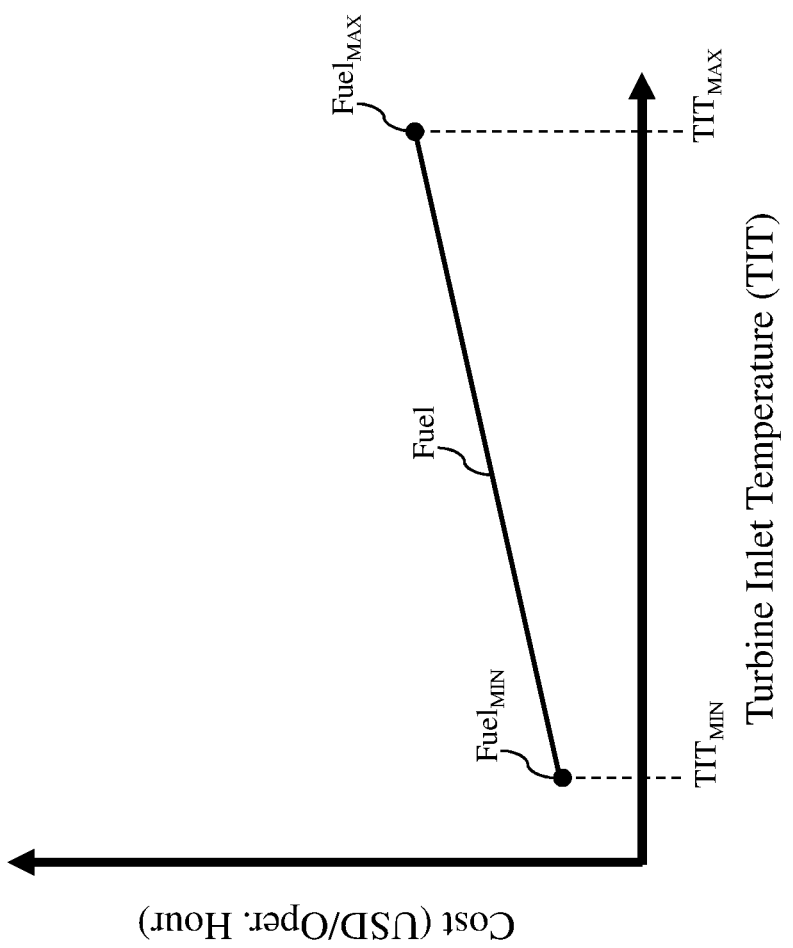
FIG. 7 shows an example Fuel Cost (per operational hour) v. Turbine Inlet Temperature (TIT) graph for operation of the gas turbine system shown in FIG. 6, according to embodiments.

FIG. 7 shows a cost versus TIT graph for a fuel cost range based on a defined TIT range for operation of GT system 30. The defined TIT range depicted in FIG. 7 may be substantially similar to that shown and discussed herein with respect to FIG. 3 and/or may be defined and/or calculated in a similar manner as well. Each of the points or plots of the line indicating fuel costs depicted in FIG. 3 may identify the cost of fuel per operational hour of GT system 30 at the corresponding TIT within the defined TIT range, as discussed herein with respect to process P2. Additionally, the fuel cost range identified by the line indicating fuel costs also represents the cost of fuel per operational hour of GT system 30 to maintain a desired, constant operational load for GT system 30. As shown in the non-limiting example of FIG. 7, the fuel cost range based on the defined TIT range may be substantially linear. That is, and distinct from the fuel cost range for GT system 30 of power plant system 12 discussed above (see, FIG. 3), the fuel cost within the fuel cost range may increase in a substantially linear manner as the corresponding TIT within the TIT range increases. As shown in FIG. 7, the minimum fuel cost ($Fuel_{MIN}$) may correspond and/or may be equal to the minimum TIT ($TIT_{MIN}$), the maximum fuel cost ($Fuel_{MAX}$) may correspond and/or may be equal to the maximum TIT ($TIT_{MAX}$), and the fuel costs identified there between may increase (e.g., linearly increase).

Figure 8:
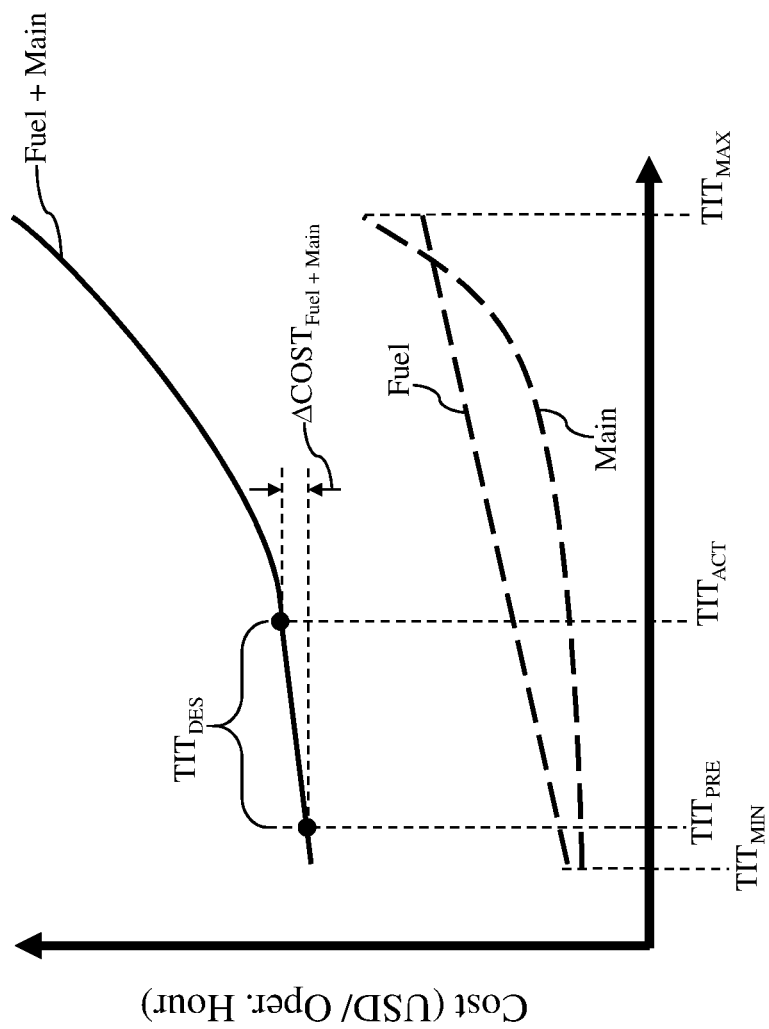
FIG. 8 shows an example Fuel and Maintenance Cost (per operational hour) v. Turbine Inlet Temperature (TIT) graph for operation of the gas turbine system shown in FIG. 6, according to embodiments.

FIG. 8 depicts a cost versus TIT graph for the calculated and/or combined fuel and maintenance (Fuel+Main) cost range based on the defined TIT range for operation of GT system 30. Additionally, and for comparative purposes, FIG. 8 also depicts the fuel cost range (shown in phantom) depicted in FIG. 7. Furthermore, a maintenance cost range (shown in phantom) for operating GT system 30 as discussed herein may also be depicted in FIG. 8. As shown in FIG. 8, and with comparison to FIG. 4, the maintenance cost per hour of operation for GT system 30 may be substantially similar or identical to the maintenance cost of operation for GT system 30 included within power plant system 12. As such, redundant explanation of these maintenance cost ranges have been omitted for clarity. Similar to fuel and maintenance cost ranges, each of the points or plots of the line indicating the calculated and/or combined fuel and maintenance (Fuel+Main) cost range depicted in FIG. 8 may identify the cost relationship of the combined fuel and maintenance cost per operational hour that may be required as GT system 30 operates at the corresponding TIT within the defined TIT range. Additionally, the cost relationship of the combined fuel and maintenance identified by the line indicating the combined fuel and maintenance (Fuel+Main) cost range also represents the combined cost per operational hour of GT system 30 to maintain the desired, constant operational load for GT system 30.

As discussed herein with respect to process P4, the fuel cost range and the maintenance range may be analyzed, compared, manipulated, combined and/or undergo computations to generate a combined fuel and maintenance cost range (Fuel+Main) depicted in FIG. 8. Once generated, a desired TIT range ($TIT_{DES}$), and/or a preferred TIT ($TIT_{PRE}$) for combustion gas 46 flowing through turbine component 48 of GT system 30 may be calculated and/or identified using the combined fuel and maintenance cost range (Fuel+Main). Additionally, calculating and/or identifying the desired TIT range ($TIT_{DES}$) for combustion gas 46 may also be dependent, at least in part, on an actual TIT ($TIT_{ACT}$) for combustion gas 46 and the associated combined fuel and maintenance cost of operation at the actual TIT ($TIT_{ACT}$).

In the non-limiting example shown in FIG. 8, the desired TIT range ($TIT_{DES}$) for combustion gas 46 flowing through turbine component 48 of GT system 30 may be calculated and/or identified as the range of TIT between a preferred TIT ($TIT_{PRE}$) and the actual TIT ($TIT_{ACT}$) for combustion gas 46 flowing through GT system 30. In a non-limiting example shown in FIG. 8, the calculated and/or identified preferred TIT ($TIT_{PRE}$) may be the lowest TIT for combustion gas 46 of GT system 30 for maintaining the desired, constant and/or fixed operation load for GT system 30. However, it is understood that in other non-limiting examples preferred TIT ($TIT_{PRE}$) may be a TIT that is not the lowest TIT for combustion gas 46, but rather is a calculated and/or identified TIT that provides the greatest cost reduction from the actual TIT ($TIT_{ACT}$), as similarly discussed herein with respect to FIG. 5. In this non-limiting example, any TIT lower than the calculated and/or identified, preferred TIT ($TIT_{PRE}$) may be still maintain the desired, constant and/or fixed operation load for GT system 30, but may approach and/or exceed operational limits and/or restrictions on the components (e.g., combustor 40, turbine component 48 and so on) of GT system 30.

Additionally, and in view of the fuel cost range relationship for GT system 30 (see, FIG. 7), the preferred TIT ($TIT_{PRE}$) may also indicate the lowest combined fuel and maintenance cost (Fuel+Main) for operating GT system 30 to produce the fixed operational load, as discussed herein. As shown in FIG. 8, the desired TIT range ($TIT_{DES}$) for combustion gas 46 may include a range of TIT temperatures that may include an associated fuel and maintenance cost (Fuel+Main) for operating GT system 30 that is lower or less than the fuel and maintenance cost (Fuel+Main) associated with the actual TIT ($TIT_{ACT}$) for combustion gas 46. As similarly discussed herein with respect to FIG. 5, allowing combustion gas 46 to flow through GT system 30 at any one of the desired TIT range ($TIT_{DES}$) may result in a reduced operational cost (e.g., fuel and maintenance cost) for power plant system 12. Additionally, the preferred TIT ($TIT_{PRE}$) includes a single TIT within the desired TIT range ($TIT_{DES}$) that may provide the largest change (e.g., decrease) in combined fuel and maintenance costs of operation from the actual TIT ($TIT_{ACT}$). Although combustion gas 46 of GT system 30 having any TIT within the desired TIT range ($TIT_{DES}$) will result in a decrease in combined fuel and maintenance costs, combustion gas 46 having a TIT equal to the preferred TIT ($TIT_{PRE}$) will yield the largest decrease in combined fuel and maintenance costs when compared to the cost associated with operating GT system 30 at the actual TIT ($TIT_{ACT}$).

Once the combined fuel and maintenance cost range (Fuel+Main), the desired TIT range ($TIT_{DES}$) and/or the preferred TIT ($TIT_{PRE}$) for combustion gas 46 flowing through turbine component 48 of GT system 30 is calculated and/or identified, control system 68 of computing device(s) 66 may control GT system 30 (see, FIG. 6). Specifically, control system 68 of computing device(s) 66 may adjust an actual TIT ($TIT_{ACT}$) for combustion gas 46 flowing to gas turbine 48 to be identical to one of the TIT within the desired TIT range ($TIT_{DES}$) for combustion gas 46. Additionally, control system 68 of computing device(s) 66 may adjust an actual TIT ($TIT_{ACT}$) for combustion gas 46 flowing to gas turbine 48 to be identical to the preferred TIT ($TIT_{PRE}$) for combustion gas 46 that may be included within and/or calculated using the desired TIT range ($TIT_{DES}$). As discussed herein with respect to process P5, the actual TIT ($TIT_{ACT}$) may be adjusted by regulating the fuel 42 mass flow supplied by the fuel tank 44 and/or adjusting the mass flow of fluid 36 flowing through compressor 32. In a non-limiting example shown in FIG. 6, control system 68 of computing device(s) 66 may regulate the fluid mass flow 36 flowing to compressor 32 by adjusting VIGV 34 and/or adjustable stator vanes 37 to increase or decrease the amount of fluid 36 that flows to compressor 32. In the non-limiting example where the mass flow is increased, the TIT for combustion gas 46 flowing to turbine component 48 may be adjusted (e.g., decreased) and maintained within the desired TIT range ($TIT_{DES}$) with the requirement of more fuel 42 provided by supply tank 44.

As a result of adjusting the fluid mass flow 36, and as shown the non-limiting in FIG. 8, the actual TIT ($TIT_{ACT}$) may be reduced to be within the desired TIT range ($TIT_{DES}$) and/or equal to the preferred TIT ($TIT_{PRE}$) to improve efficiency of GT system 30, as discussed herein. Additionally, and as discussed herein, adjusting the actual TIT ($TIT_{ACT}$) to a TIT included within the desired TIT range ($TIT_{DES}$) and/or to be identical to the preferred TIT ($TIT_{PRE}$) may ensure GT system 30 operates, produces and/or maintains the fixed, constant and/or desired operational load. Furthermore, it is understood that the actual TIT range ($TIT_{ACT}$) may be continuously adjusted to match a TIT included within the desired TIT range ($TIT_{DES}$) and/or to maintain operation of GT system 30 at the fixed, constant and/or desired operational load.

Operating at the desired TIT range ($TIT_{DES}$) for combustion gas 46 may increase thermal and/or operational efficiency of GT system 30, while maintaining a desired, fixed and/or constant operational load for GT system 30. In a non-limiting example, thermal efficiency of GT system may increase as a result of an increase in mass flow of fluid 36 and the resulting decrease in TIT for combustion gas 46.

Additionally, the overall cost of operation for GT system 30 may be decreased by allowing control system 68 of computing device(s) 66 to control the operation of GT system 30 while improving thermal and/or operational efficiency of GT system 30, as discussed herein. As shown in the non-limiting example of FIG. 8, the actual TIT ($TIT_{ACT}$) may be the TIT for GT system 30 that is predetermined based on the operational parameters of GT system 30, industry standards and/or calculated operations for GT system 30. By performing the processes for controlling the operation of GT system 30 using control system 68 (e.g., adjusting the mass flow of fluid 36 to GT system 30 through VIGV 34 and/or adjustable stator vanes 37, adjusting the fuel 42 flow to combustor 40) to maintain desired TIT range ($TIT_{DES}$) of combustion gas 46 flowing to turbine component 48, the overall operation cost savings and/or cost reduction while still achieving the fixed, constant and/or desired operational load is readily apparent. Specifically, as shown in FIG. 8, the overall change or decrease in combined fuel and maintenance cost ($\Delta COST_{Fuel+Main}$) when comparing GT system 30 operating under the actual TIT ($TIT_{ACT}$) with any TIT included within the desired TIT range ($TIT_{DES}$) is significant. That is, and as shown in FIG. 8, the combined fuel and maintenance cost decreases when comparing the GT system 30 operating under the actual TIT ($TIT_{ACT}$) with the desired TIT range ($TIT_{DES}$), while the thermal and/or operational efficiency of GT system 30 increases significantly.

Although discussed herein as being performed by computing device(s) 66 and/or control system 68, it is understood that at least some of the operations may be performed manually and/or by an operator of power plant system 12. For example, adjustment to the actual TIT ($TIT_{ACT}$) of combustion gas 46 flowing through turbine component 48 may be performed manually by an operator. Specifically, computing device(s) 66 and/or control system 68 may determine the desired or preferred TIT ($TIT_{DES}$, $TIT_{DES}$) and may provide an operator of power plant system 12 with an output or indicator that the actual TIT ($TIT_{ACT}$) should be adjusted and/or how to adjust the actual TIT ($TIT_{ACT}$). With the provided output from computing device(s) 66 and/or control system 68, the operator may adjust the actual TIT ($TIT_{ACT}$) by manually or physically performing processes previously discussed herein (e.g., adjusting VGIV 34, adjustable stator vanes 37, and so on). The component configured to provide the output or indicator to the operator may be any suitable component including, but not limited to, a monitor providing a visual indicator, a printer providing a physical print out and so on.

Figure 9:
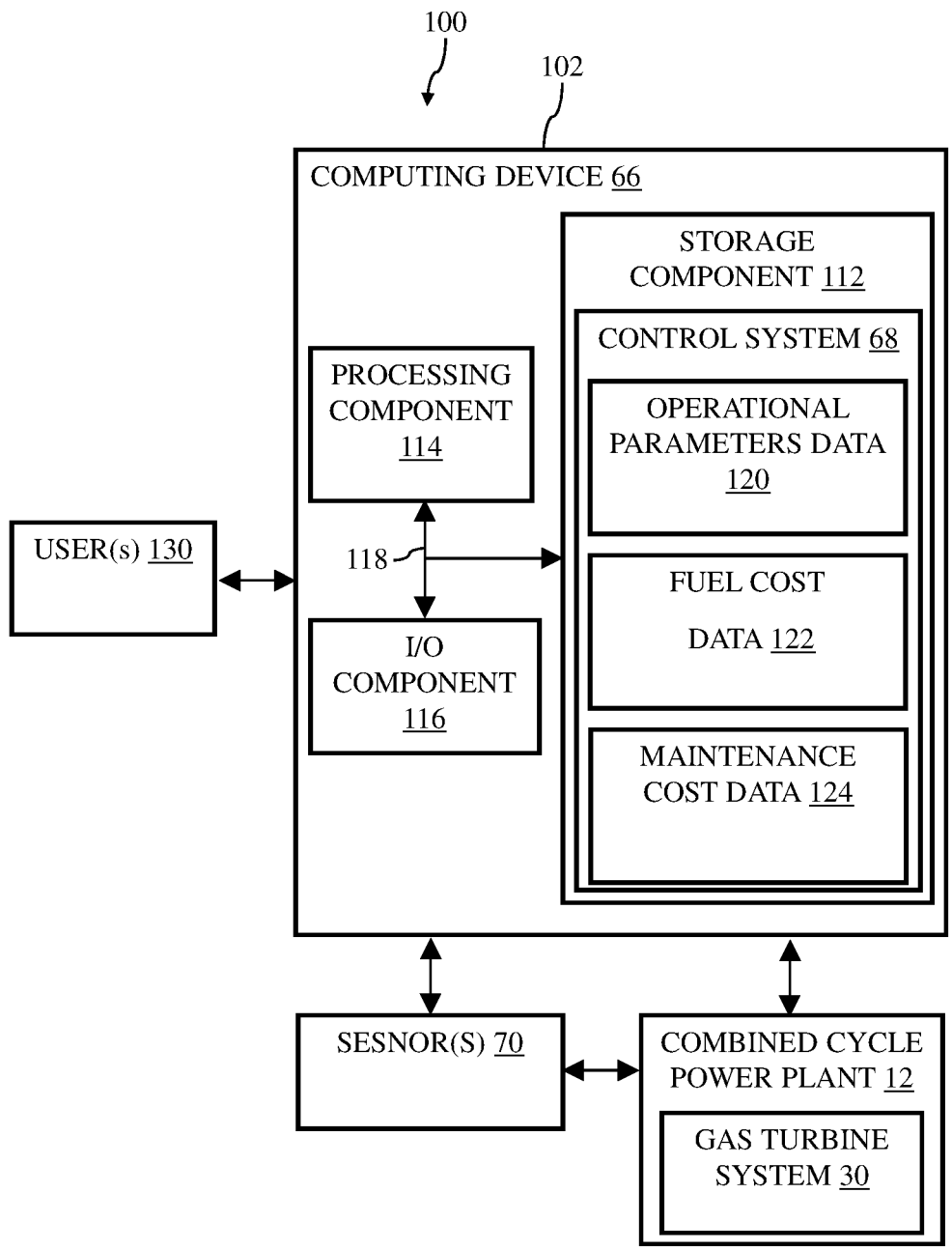
FIG. 9 shows an environment including a control system for controlling the combined cycle power plant of FIG. 1 and/or the gas turbine system of FIG. 6, according to embodiments.

FIG. 9 shows an illustrative environment 100. To this extent, environment 100 includes computer infrastructure 102 that can perform the various process steps described herein for controlling operations of power plant system 12 including gas turbine system 30, or alternatively, controlling operations of GT system 30 where only a GT system 30 exists. In particular, computer infrastructure 102 is shown including a computing device 66 that comprises control system 68, which enables computing device 66 to control operation of power plant system 12/GT system 30 by performing one or more of the process steps of the disclosure.

Computing device 66 is shown including a storage component 112, a processing component 114, an input/output (I/O) component 116, and a bus 118. Further, computing device 66 is shown in communication with power plant system 12 and/or sensors 70. As is known in the art, in general, processing component 114 executes computer program code, such as control system 68, that is stored in storage component 112 or an external storage component (not shown). While executing computer program code, processing component 114 can read and/or write data, such as control system 68, to/from storage component 112 and/or I/O component 116. Bus 118 provides a communications link between each of the components in computing device 66. I/O component 116 can comprise any device that enables a user 130 to interact with computing device 66 or any device that enables computing device 66 to communicate with one or more other computing devices. Input/output devices (including but not limited to keyboards, displays, pointing devices, etc.) can be coupled to the system either directly or through intervening I/O controllers.

In any event, computing device 66 can comprise any general purpose computing article of manufacture capable of executing computer program code installed by a user 130 (e.g., a personal computer, server, handheld device, etc.). However, it is understood that computing device 66 and control system 68 are only representative of various possible equivalent computing devices that may perform the various process steps of the disclosure. To this extent, in other embodiments, computing device 66 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed herein, control system 68 enables computing infrastructure 102 to control operation of power plant system 12. To this extent, control system 68 is shown including operational parameters data 120, fuel cost data 122 and maintenance cost data 124. Operation of each of these data is discussed further herein. However, it is understood that some of the various data shown in FIG. 9 can be implemented independently, combined, and/or stored in memory for one or more separate computing devices that are included in computer infrastructure 102. Further, it is understood that some of the data and/or functionality may not be implemented, or additional data and/or functionality may be included as part of environment 100.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., obtaining operational parameters data for turbine component 48, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims herein are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system, comprising:
a power plant system including a turbine component of a gas turbine system; and
at least one computing device in communication with the power plant system, the at least one computing device configured to control the power plant system by performing processes including:
defining a turbine inlet temperature range for a combustion gas flowing through the turbine component of the gas turbine system, the turbine inlet temperature range bound by and including a minimum turbine inlet temperature and a maximum turbine inlet temperature for maintaining a single, desired operational load for the power plant system;
determining a fuel cost range for maintaining the single, desired operational load for the power plant system within the turbine inlet temperature range, the fuel cost range bound by and including:
a minimum fuel cost associated with the maximum turbine inlet temperature of the turbine inlet temperature range; and
a maximum fuel cost associated with the minimum turbine inlet temperature of the turbine inlet temperature range;
determining a maintenance cost range for maintaining the single, desired operational load for the power plant system within the turbine inlet temperature range, the maintenance cost range bound by and including:
a minimum maintenance cost associated with the minimum turbine inlet temperature of the turbine inlet temperature range; and
a maximum maintenance cost associated with the maximum turbine inlet temperature of the turbine inlet temperature range;
generating a combined fuel and maintenance cost range using the determined fuel cost range and the determined maintenance cost range, the generated combined fuel and maintenance cost range within the turbine inlet temperature range;
calculating a desired turbine inlet temperature range for the combustion gas flowing through the turbine component of the gas turbine system based on the generated, combined fuel and maintenance cost range; and
adjusting an actual turbine inlet temperature of the combustion gas flowing through the turbine component to be within the calculated, desired turbine inlet temperature range for the combustion gas flowing through the turbine component,
wherein the determined fuel cost range includes a cost of fuel per operational hour of the turbine component for each turbine inlet temperature of the defined turbine inlet temperature range, and
wherein the determined maintenance cost range includes a cost of maintenance per operational hour for the turbine component for each turbine inlet temperature of the defined turbine inlet temperature range.

2. The system of claim 1, wherein the at least one computing device is configured to adjust the actual turbine inlet temperature of the combustion gas flowing through the turbine component of the gas turbine system by performing processes including:
regulating the mass flow of a fluid flowing through a compressor of the gas turbine system.

3. The system of claim 2, wherein the at least one computing device is configured to regulate the mass flow of the fluid flowing through the compressor by performing processes including at least one of:
adjusting a variable inlet guide vane positioned on the compressor of the gas turbine system, or
adjusting a variable stator vane positioned within the compressor of the gas turbine system.

4. The system of claim 1, wherein the at least one computing device is configured to adjust the actual turbine inlet temperature of the combustion gas flowing through the turbine component of the gas turbine system by performing processes including:
regulating a mass flow of fuel flowing to a combustor of the gas turbine system.

5. The system of claim 1, wherein the processes performed by the at least one computing device to control the power plant system further include:
reducing fuel consumption by the gas turbine system of the power plant system.

6. The system of claim 1, wherein the at least one computing device is configured to define the turbine inlet temperature range for the combustion gas flowing through the turbine component of the gas turbine system by performing processes including:
determining operational parameters of the gas turbine system of the power plant system; and
generating the turbine inlet temperature range for the combustion gas flowing through the turbine component of the gas turbine system based on the determined operational parameters of the gas turbine system of the power plant system.

7. The system of claim 1, wherein the processes performed by the at least one computing device to control the power plant system further include:

continuously adjusting the actual turbine inlet temperature of the combustion gas to be within the calculated, desired turbine inlet temperature range to maintain the single, desired operational load for the power plant system.

8. The system of claim 1, wherein the processes performed by the at least one computing device to control the power plant system further include:
calculating a single, preferred turbine inlet temperature included within the calculated, desired turbine inlet temperature range, the calculated, single preferred turbine inlet temperature including a lowest cost per operational hour included in the generated, combined fuel and maintenance cost range.

9. A non-transitory computer readable medium wherein is stored a computer program product, the computer program product comprising program code, which when executed by at least one computing device, causes the at least one computing device to control a power plant system including a turbine component of a gas turbine system, by performing processes including:
defining a turbine inlet temperature range for a combustion gas flowing through the turbine component of the gas turbine system, the turbine inlet temperature range bound by and including a minimum turbine inlet temperature and a maximum turbine inlet temperature for maintaining a desired operational load for the power plant system;
determining a fuel cost range for maintaining the desired operational load for the power plant system within the turbine inlet temperature range, the fuel cost range bound by and including:
a minimum fuel cost associated with the maximum turbine inlet temperature of the turbine inlet temperature range; and
a maximum fuel cost associated with the minimum turbine inlet temperature of the turbine inlet temperature range;
determining a maintenance cost range for maintaining the desired operational load for the power plant system within the turbine inlet temperature range, the maintenance cost range bound by and including:
a minimum maintenance cost associated with the minimum turbine inlet temperature of the turbine inlet temperature range; and
a maximum maintenance cost associated with the maximum turbine inlet temperature of the turbine inlet temperature range;
generating a combined fuel and maintenance cost range using the determined fuel cost range and the determined maintenance cost range, the generated combined fuel and maintenance cost range within the turbine inlet temperature range;
calculating a desired turbine inlet temperature range for the combustion gas flowing through the turbine component of the gas turbine system based on the generated, combined fuel and maintenance cost range; and
adjusting an actual turbine inlet temperature of the combustion gas flowing through the turbine component to be within the calculated, desired turbine inlet temperature range for the combustion gas flowing through the turbine component,
wherein the determined fuel cost range includes a cost of fuel per operational hour of the turbine component for each turbine inlet temperature of the defined turbine inlet temperature range, and
wherein the determined maintenance cost range includes a cost of maintenance per operational hour for the turbine component for each turbine inlet temperature of the defined turbine inlet temperature range.

10. The non-transitory computer readable medium of claim 9, wherein the adjusting of the actual turbine inlet temperature of the combustion gas flowing through the turbine component of the gas turbine system includes regulating at least one of:
a mass flow of a fluid flowing through a compressor of the gas turbine system, or
a mass flow of fuel flowing to a combustor of the gas turbine system.

11. The non-transitory computer readable medium of claim 10, wherein the regulating of the mass flow of a fluid flowing through a compressor of the gas turbine system includes at least one of:
adjusting a variable inlet guide vane positioned on the compressor of the gas turbine system, or
adjusting a variable stator vane positioned within the compressor of the gas turbine system.

12. The non-transitory computer readable medium of claim 9, the defining of the turbine inlet temperature range for the combustion gas flowing through the turbine component of the gas turbine system includes:
determining operational parameters of the gas turbine system of the power plant system; and
generating the turbine inlet temperature range for the combustion gas flowing through the turbine component of the gas turbine system based on the determined operational parameters of the gas turbine system of the power plant system.

13. The non-transitory computer readable medium of claim 9, wherein the at least one computing device performs additional processes including:
calculating a single, preferred turbine inlet temperature included within the calculated, desired turbine inlet temperature range, the calculated, single preferred turbine inlet temperature including a lowest cost per operational hour included in the generated, combined fuel and maintenance cost range.

14. A system comprising:
a gas turbine system including a turbine component; and
at least one computing device in communication with the gas turbine system, the at least one computing device configured to control the gas turbine system by performing processes including:
defining a turbine inlet temperature range for a combustion gas flowing through the turbine component of the gas turbine system, the turbine inlet temperature range bound by and including a minimum turbine inlet temperature and a maximum turbine inlet temperature for maintaining a desired operational load for the gas turbine system;
determining a fuel cost range for maintaining the desired operational load for the gas turbine system within the turbine inlet temperature range, the fuel cost range bound by and including:
a minimum fuel cost associated with the minimum turbine inlet temperature of the turbine inlet temperature range; and
a maximum fuel cost associated with the maximum turbine inlet temperature of the turbine inlet temperature range;
determining a maintenance cost range for maintaining the desired operational load for the gas turbine system within the turbine inlet temperature range, the maintenance cost range bound by and including:
a minimum maintenance cost associated with the minimum turbine inlet temperature of the turbine inlet temperature range; and
a maximum maintenance cost associated with the maximum turbine inlet temperature of the turbine inlet temperature range;
generating a combined fuel and maintenance cost range using the determined fuel cost range and the determined maintenance cost range, the generated combined fuel and maintenance cost range within the turbine inlet temperature range;
calculating a desired turbine inlet temperature range for the combustion gas flowing through the turbine component of the gas turbine system based on the generated, combined fuel and maintenance cost range; and
adjusting an actual turbine inlet temperature of the combustion gas flowing through the turbine component to be within the calculated, desired turbine inlet temperature range for the combustion gas flowing through the turbine component,
wherein the determined fuel cost range includes a cost of fuel per operational hour of the turbine component for each turbine inlet temperature of the defined turbine inlet temperature range, and
wherein the determined maintenance cost range includes a cost of maintenance per operational hour for the turbine component for each turbine inlet temperature of the defined turbine inlet temperature range.

15. The system of claim 14, wherein the at least one computing device is configured to adjust the actual turbine inlet temperature of the combustion gas flowing through the turbine component of the gas turbine system by performing processes including at least one of:
regulating the mass flow of a fluid flowing through a compressor of the gas turbine system, or
regulating a mass flow of fuel flowing to a combustor of the gas turbine system.

16. The system of claim 15, wherein the at least one computing device is configured to regulate the mass flow of the fluid flowing through the compressor by performing processes including at least one of:
adjusting a variable inlet guide vane positioned on the compressor of the gas turbine system, or
adjusting a variable stator vane positioned within the compressor of the gas turbine system.

17. The system of claim 14, wherein the processes performed by the at least one computing device to control the gas turbine system further include:
continuously adjusting the actual turbine inlet temperature of the combustion gas to be within the calculated, desired turbine inlet temperature range to maintain the desired operational load for the gas turbine system.

18. The system of claim 14, wherein the at least one computing device is configured to adjust the actual turbine inlet temperature of the combustion gas flowing through the turbine component of the gas turbine system by performing processes including:
adjusting the actual turbine inlet temperature of the combustion gas to be identical to a preferred turbine inlet temperate for the combustion gas, the preferred turbine inlet temperate for the combustion gas within the calculated, desired turbine inlet temperature range.

* * * * *